(12) United States Patent
Vilo

(10) Patent No.: US 6,521,121 B1
(45) Date of Patent: Feb. 18, 2003

(54) APPARATUS FOR REMOVING MATERIAL FROM PRESSURISED SPACE

(75) Inventor: Jaakko Vilo, Nastola (FI)

(73) Assignee: Outokumpu OYJ (FI)

( * ) Notice: Subject to any disclaimer, the term of this patent is extended or adjusted under 35 U.S.C. 154(b) by 0 days.

(21) Appl. No.: 09/806,746

(22) PCT Filed: Oct. 22, 1999

(86) PCT No.: PCT/FI99/00879

§ 371 (c)(1),
(2), (4) Date: Apr. 3, 2001

(87) PCT Pub. No.: WO00/24495

PCT Pub. Date: May 4, 2000

(30) Foreign Application Priority Data

Oct. 27, 1998 (FI) .................................................. 982333

(51) Int. Cl.[7] .......................... B01D 29/94; B01D 33/76
(52) U.S. Cl. .................... 210/112; 210/143; 210/416.1; 222/64
(58) Field of Search ................................ 210/109, 112, 210/113, 106, 97, 143, 407; 222/64, 545

(56) References Cited

U.S. PATENT DOCUMENTS 1,784,372 A * 12/1930 McCaskell

| 3,878,096 | A | * | 4/1975 | Somogyi |
| 5,362,403 | A | | 11/1994 | Dosoudil |
| 5,593,583 | A | * | 1/1997 | Geldmacher |
| 6,010,041 | A | | 1/2000 | Lonardi et al. |

FOREIGN PATENT DOCUMENTS

| JP | 57-045314 | 3/1982 |
| WO | WO 92/22372 | 12/1992 |
| WO | WO 97/07880 | 3/1997 |
| WO | WO 99/49951 | 10/1999 |

* cited by examiner

Primary Examiner—Joseph W. Drodge
Assistant Examiner—Terry K. Cecil
(74) Attorney, Agent, or Firm—Morgan & Finnegan LLP

(57) ABSTRACT

The invention relates to an apparatus for removing solid material, particularly for removing finely divided solid material created in a filtering process from a pressurized space, the apparatus being provided with members for feeding the treated material to a process taking place in a pressurized space, as well as for removing the products created in said process from the pressurized space. According to the invention, in a discharge station (4,25) connected to the pressurized space (2,22), there are provided discharge apertures (8,28) for the solid material (5,24) to be removed from the pressurized space (2,22). The discharge apertures (8,28) are provided with at least one adjusting member (9,29) in order to adjust (11,31) the quantity of the material located in the discharge station (4,25) and to be removed from the discharge station (4,25).

10 Claims, 2 Drawing Sheets

APPARATUS FOR REMOVING MATERIAL FROM PRESSURISED SPACE

FIELD OF THE INVENTION

The present invention relates to an apparatus used for removing solid material, particularly to an apparatus for removing finely divided solid material created in the filtering process, from pressurised space, to which apparatus there are connected members for feeding the material under treatment to a process carried out in a pressurised space and for removing the products created in the process from said pressurised space.

BACKGROUND OF THE INVENTION

Normally material is removed from a pressurised space so that the pressure in said space is reduced, and the material discharge outlet is opened in order to remove said material from said space. In case the prevailing pressure should be maintained, in connection with the material discharge outlet there is installed a valve or valves whereby said material can be removed from said space without essentially changing the pressure prevailing therein. The employed valves can be electric, hydraulic or pneumatic, in which case the material usually creates a pressure against the valve flap. When the pressure surpasses a predetermined limit, the valve is opened, and the material is discharged from the space. When the amount of discharged material rises to a level where the pressure caused by said material is sufficiently reduced, the valve is closed. This kind of valve can be for example an eccentric flap valve, where the pressure is effective on the other side of the valve flap. However, the valve is not suited for finely divided solids, because in connection with the closing of the valve, in between the valve flap and the valve housing, there remain solid particles that reduce the compactness of the sealing achieved by the valve and finally make the valve unfit for use.

Pneumatically sealed valves are also used for removing material from a pressurised space. A pneumatically sealed spherical valve has a uniform pneumatic sealing, but otherwise the structure corresponds in principle to a ball valve, in which case the drawbacks are a large size and a high price. Known pneumatically sealed flap valves are in shape symmetric in relation to the axis, in which case the drawback is their sealing at the axis. This type of valve arrangement is also easily blocked.

SUMMARY OF THE INVENTION

From the FI patent 68,977, published Aug. 30, 1985, there is known a filter device that with gearing and actuator is used in an over pressure space, and the filtering products thereof, i e. the finely divided solids, are removed through a lock gate from the over pressure space. The employed lock gate is for instance a blade lock or a spiral conveyor, in which case the solids flow is utilised in the operation of the lock gate. Now the finely divided solids to be removed can to a certain extent be prevented from getting in between the locking member of the lock gate and the wall, because the lock gate as such does not perform a motion opposite to the circulation direction of the solids, but the solids always flow in the same direction. However, the operation of this kind of a lock gate is dependent on the solids flow, because the solids flow as such maintains the compactness achieved by means of the lock gate as the position of the blades alters, in order to maintain the over pressure in the over pressure space.

The U.S. Pat. No. 5,362,403 specifies a filtering device and method for removing the filter cake from the filtering part of the filtering device. In said method, the filter cake is transferred by a spiral conveyor to a discharge shaft. In the bottom part of said discharge shaft, there is installed a locking member which is hydraulically controlled. According to the U.S. Pat. No. 5,362,403, the locking member together with the discharge shaft forms a pressure lock in between the filtering device and normal air pressure. The operation of the locking member is controlled by two electrodes attached to the discharge shaft, so that when the filter cake has reached a certain height in the discharge shaft, the filter cake creates an electric lock in between the electrodes, the control member opens the locking member and the filter cake is discharged through the discharge shaft. The removal of the filter cake is thus carried out in a discontinuous manner, and in connection with the removal, it is possible that the pressure is reduced in the filtering device proper, too.

The object of the present invention is to eliminate some of the drawbacks of the prior art and to achieve an improved apparatus with a simpler structure and a lower price for removing filtered material from pressurised space, said apparatus functioning automatically according to operating pressure and material flow. The essential novel features of the invention are apparent from the appended claims.

In an apparatus according to the invention, the solid material treated in pressurised space—such as finely divided solid material, created in a filtering, process—is first conducted to a solid material discharge station connected to said pressurised space. With respect to the pressurised space, the discharge station is advantageously installed so that the treated solid material can by means of gravitation be moved from the pressurised space to the discharge station. Those surfaces of the discharge station that deviate from the pressurised space are provided with discharge apertures. In any single discharge aperture, there is installed at least one member for adjusting the quantity of the solid material flowing through said discharge aperture. The members that facilitate the removal of the material from the pressurised space are advantageously set to function so that material is removed from the discharge station essentially continuously at the same time as the quantity and surface height of the solid material treated in the discharge station is adjusted by controlling the operation of the members provided at the discharge apertures.

According to the invention, at least part of the discharge apertures provided in the discharge station of the solid material treated in a pressurised space are positioned, with respect to the flowing direction of the material, advantageously so that the material flowing through the discharge aperture is removed from the discharge station by means of gravitation. The discharge apertures, or at least part thereof, can also be positioned so that in order to remove the material flowing via the discharge apertures from the pressurised space, there is utilised the pressure difference between the pressurised space and the space outside the pressurised space.

According to the invention, in the discharge aperture of the discharge station, there is connected a member, i.e. a valve, for adjusting the quantity of the solid material flowing through said discharge aperture, said valve being advantageously a pinch valve for a rubber tube, a pinch valve for a rubber hose or a suction valve. Moreover, in the adjusting member connected to the discharge aperture, there is further connected an electrically, hydraulically or pneumatically operated actuator which controls the operation of the adjusting member in order to make an advantageous quantity of the material pass through the discharge aperture.

The adjusting members, i.e. valves, connected to single discharge apertures are by means of actuators made to operate, with respect to each other, so that the surface height of the material located at the discharge station remains essentially at the same predetermined value. Advantageously the material surface height applied at the discharge station is defined so that the material arriving to the discharge station achieves the material surface before it can be removed from the discharge station through the first discharge aperture in the material flowing direction. The fact that the material surface height remains at the same value also results in that the quantity of material located at the discharge station is employed as a pressure lock between the pressurised space and for example a space with a normal pressure.

By controlling the adjusting members, i.e. valves, that are advantageously connected to single discharge apertures, there also is achieved an essentially continuous material flow from the discharge station to the exterior. This essentially facilitates the further treatment of the material treated in the pressurised space.

The treated material discharge station connected to the pressurised space is installed, with respect to the pressurised space, either in an essentially vertical position, or in an essentially inclined position, so that the material is removed via an aperture provided between the pressurised space and the discharge station, from the pressurised space to the discharge station, essentially by making use of gravitation. While the discharge station is in an essentially vertical position with respect to the pressurised space, the discharge station is advantageously formed of a tubular piece, and at that end of said piece that deviates from the pressurised space, there is installed a flow stop member, such as a flap, for the solid material to be removed. Said flow stop member is provided with several material discharge apertures, to which there is further connected at least one material flow adjusting member. By controlling the operation of the adjusting members with actuators connected to said adjusting members, so that the material surface height remains essentially the same, the material in itself forms part of the pressure lock between the pressurised space and the surrounding space. Moreover, the adjusting members are advantageously controlled so that via at least one discharge aperture provided in the discharge station, material flows out of the discharge station, in which case the material flow is maintained essentially continuous.

With respect to the pressurised space, the discharge station can be installed in an inclined position, in which case the material coming from the pressurised space passes at least partly along at least one wall of the discharge station. In that case the discharge station can be formed of a tubular piece or pieces, where at least part of the walls are planar. At that end of the discharge station that deviates from the pressurised space, there is further installed a flow stop member, a flap. In order to advantageously discharge the material treated in the pressurised space, both in the discharge station walls and in the flow stop member provided at the end of the discharge station, there are formed discharge apertures whereto there is further connected at least one flow stop member in order to maintain the material surface height on a desired level and for creating an essentially continuous material flow between the pressurised space and the surrounding space.

DESCRIPTION OF THE DRAWINGS

The invention is explained in more detail with respect to the appended drawings, where.

Figure 1:
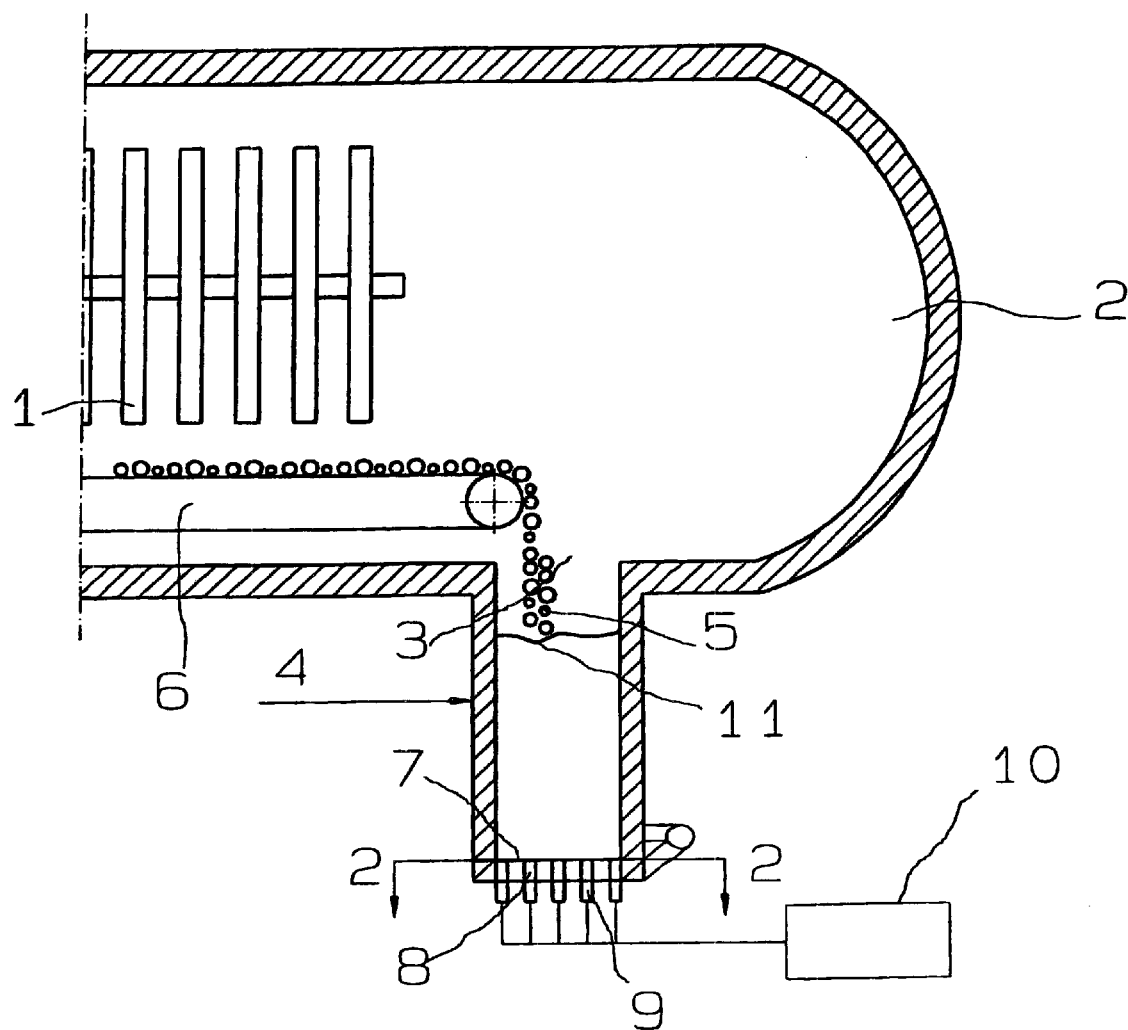
FIG. 1 illustrates a preferred embodiment of the invention in a side-view diagram.
Figure 2:
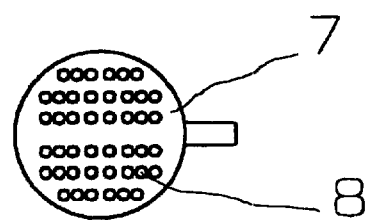
FIG. 2 illustrates the embodiment of FIG. 1, seen from direction 2—2.

According to FIGS. 1 and 2, around the apparatus 1 used for filtering slurry-like material, there is installed a pressure vessel 2 in order to realise the filtering process as pressure filtering. In the wall of the pressure vessel 2 constituting the pressurised space, there is formed an aperture 3 whereto there is connected a member 4 serving as the discharge station of the pressurised space. The member 4 serving as the discharge station is installed in an essentially vertical position with respect to the flowing direction of the material 5. In order to convey the solid material 5, treated in the apparatus 1 and obtained therefrom, from the apparatus 1 to the discharge station aperture 3, inside the pressure vessel 2 there is installed a conveyor 6, which conveyor 6 drops the material 5 through the aperture 3 to the discharge station 4. The discharge station 4 is formed of a tubular piece, and at that end of said tubular piece that deviates from the pressure vessel 2, there is installed a flap 7 in order to prevent the material 5 from having a free access from the pressure vessel 2 to the surrounding space. In the flap 7, there are formed apertures 8, through which the material 5 can flow out of the pressurised space. When necessary, apertures 8 can also be made in the wall of the discharge station 4. In each aperture 8, there is connected at least one material adjusting member 9, the operation of which is controlled by a control member 10 connected to the adjusting member. The control members 10 are mutually connected so that the surface height 11 of the material 5 can be maintained essentially on the same predetermined level, while the flow of the material 5 coming out of the discharge station 4 is maintained essentially continuous.

Figure 3:
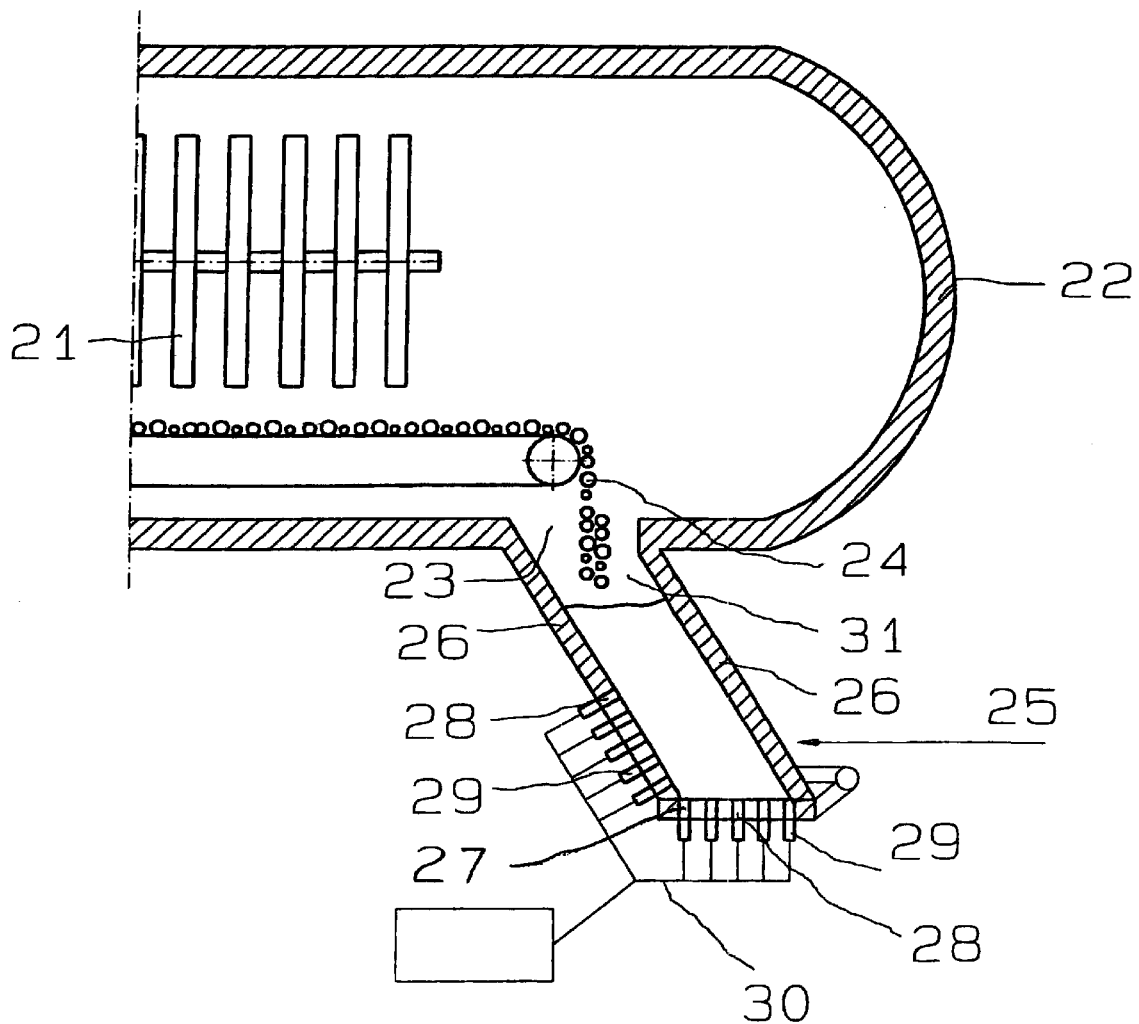
FIG. 3 illustrates another preferred embodiment of the invention in a side-view diagram.

In FIG. 3, an apparatus 21 used for filtering slurry-like material is placed inside a pressure vessel 22, and the wall of the pressure vessel 22 is provided with an aperture 23 in order to remove from the pressure vessel 22 the solid material 24 filtered and obtained from the apparatus 21. In the aperture 23, there is connected a discharge station 25 for the solid material 24, through which the material 24 can be removed from the pressure vessel 22, so that the removal of the material can be carried out without essentially reducing the pressure prevailing in the pressure vessel 22. The discharge station 25 is installed in an inclined position with respect to the wall of the pressure vessel 22, and the discharge station 25 is formed of essentially planar walls 26, which form a polygon in cross-section. At that end of the discharge station 25 that deviates from the pressure vessel 22, there is installed a flow stop member 27 in order to prevent the material 24 from having free access out of the pressurised space. In the walls of the discharge station 26, and in the flow stop member 27 provided at the end of the discharge station, there are made material discharge apertures 28, through which the material 24 can be removed from the discharge station 25. In the material discharge apertures 28, there is connected at least one flow adjusting member, i.e. a valve 29. With respect to each other, the valves 29 serving as the adjusting members are interconnected by means of actuators 30, so that the desired material surface height 31 and the continuity of the material flow from the discharge station to the space surrounding the pressurised space can essentially be maintained. Depending on the quantity of material 24 coming from the apparatus 21 and removed via the aperture 23, the discharge apertures 28 are kept open, by means of the adjusting members 29, for varying duration at varying times, so that the surface height 31 is essentially maintained.

What is claimed is:

1. An apparatus for removing finely divided solid material created in a filtering process, from a pressure vessel containing a pressurised space, to which apparatus there are connected members for feeding the material to be treated into a process taking place in said pressurised space, as well as for removing the products created in said process from said pressurised space, and said pressure vessel containing said pressurized space is attached to an end of a discharge station provided with an adjusting member adapted to discharge a material quantity from said pressurized space, the discharge station connected to the pressure vessel containing said pressurised space, said discharge station comprising discharge apertures formed therein for removing said finely divided solid material from the pressure vessel containing the pressurised space, each of said discharge apertures being provided with at least one adjusting member for adjusting the quantity of material that is located in the discharge station and which is essentially continuously removed from the discharge station, a control member connected to each of said adjusting members and adapted to maintain an essentially continuous flow of said solid material through said discharge apertures while maintaining a height of solid material in said discharge station at a predetermined level, the quantity of material located in the discharge station serving as a pressure lock between the pressurised space and the surrounding space.

2. An apparatus according to claim 1, wherein said discharge apertures are formed at an end of the discharge station that is opposed to the end of the discharge station connected to the pressure vessel containing the pressurised space.

3. An apparatus according to claim 1 or 2, wherein sidewalls of the discharge station between the end connecting the pressure vessel containing the pressurised space and the end opposed to that end, there are formed material discharge apertures.

4. An apparatus according to claim 1 or 2, wherein each adjusting member connected to each of the discharge apertures is a pinch valve for a rubber tube.

5. An apparatus according to claim 1 or 2, wherein each adjusting member connected to each of the material discharge apertures is a pinch valve for a rubber hose.

6. An apparatus according to claim 1 or 2, wherein each adjusting member connected to the material discharge apertures is a suction valve.

7. An apparatus according to claim 1 or 2, wherein the discharge station has a tubular cross section.

8. An apparatus according to claim 1 or 2, wherein the discharge station at least partly comprises essentially planar walls.

9. An apparatus according to claim 1 or 2, wherein the discharge station is in an essentially vertical position with respect to sidewalls of the pressure vessel.

10. An apparatus according to claim 1 or 2, wherein the discharge station is in an inclined position with respect to sidewalls of the pressure vessel.

* * * * *